(12) United States Patent
Yang

(10) Patent No.: US 12,021,966 B2
(45) Date of Patent: Jun. 25, 2024

(54) EMBEDDED UNIVERSAL INTEGRATED CIRCUIT CARD (eUICC) PROFILE CONTENT MANAGEMENT

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/818,953

(22) Filed: Aug. 10, 2022

(65) Prior Publication Data

US 2022/0385446 A1 Dec. 1, 2022

Related U.S. Application Data (62) Division of application No. 15/940,797, filed on Mar. 29, 2018, now Pat. No. 11,533,160.

(Continued)

(51) Int. Cl.
*H04L 9/00* (2022.01)
*H04L 9/32* (2006.01)
(Continued)

(52) U.S. Cl.
CPC ............ *H04L 9/006* (2013.01); *H04L 9/3273* (2013.01); *H04L 63/0853* (2013.01); *H04L 67/30* (2013.01); *H04L 67/306* (2013.01); *H04W 8/245* (2013.01); *H04W 12/0433* (2021.01); *H04W 12/069* (2021.01); *H04W 12/106* (2021.01); *H04W 12/35* (2021.01);
(Continued)

(58) Field of Classification Search
CPC ... H04L 9/006; H04L 9/3273; H04L 63/0853; H04L 67/30; H04L 67/306; H04L 9/321; H04L 2209/80; H04W 12/106; H04W 12/0433; H04W 12/069; H04W 12/35; H04W 12/42; H04W 8/245
See application file for complete search history.

(56) References Cited

U.S. PATENT DOCUMENTS

2010/0049984 A1 2/2010 Masushio et al.
2011/0208965 A1* 8/2011 Machani ............... H04L 9/0891
713/168
(Continued)

OTHER PUBLICATIONS

"RSP Architecture Version 1.0," GSM Association, Dec. 23, 2015, 52 pages.
(Continued)

*Primary Examiner* — Ashokkumar B Patel
*Assistant Examiner* — Forrest L Carey
(74) *Attorney, Agent, or Firm* — DICKINSON WRIGHT RLLP (57) ABSTRACT

A mobile network operator (MNO) uses a provisioning server to update or install profile content in a profile or electronic subscriber identity module (eSIM). In an exemplary embodiment, the profile is present on a secure element such as an embedded universal integrated circuit card (eUICC) in a wireless device. One or more MNOs use the provisioning server to perform profile content management on profiles in the eUICC. In some embodiments, an MNO has a trust relationship with the provisioning server. In some other embodiments, the MNO does not have a trust relationship with the provisioning server and protects payload targeted for an MNO-associated profile using an over the air (OTA) key.

13 Claims, 9 Drawing Sheets

Related U.S. Application Data (60) Provisional application No. 62/482,138, filed on Apr. 5, 2017.

(51) Int. Cl.
    *H04L 9/40*           (2022.01)
    *H04L 67/30*         (2022.01)
    *H04L 67/306*       (2022.01)
    *H04W 8/24*          (2009.01)
    *H04W 12/0433*     (2021.01)
    *H04W 12/069*      (2021.01)
    *H04W 12/106*      (2021.01)
    *H04W 12/30*       (2021.01)
    *H04W 12/42*       (2021.01)

(52) U.S. Cl.
    CPC ............. *H04W 12/42* (2021.01); *H04L 9/321* (2013.01); *H04L 2209/80* (2013.01)

(56) References Cited

U.S. PATENT DOCUMENTS

| | | |
|---|---|---|
| 2014/0143534 A1 | 5/2014 | Chastain et al. |
| 2015/0143125 A1* | 5/2015 | Nix ..................... H04W 12/02 713/171 |
| 2015/0163056 A1 | 6/2015 | Nix |
| 2015/0341791 A1 | 11/2015 | Yang et al. |
| 2015/0347786 A1* | 12/2015 | Yang ..................... H04W 8/183 726/26 |
| 2016/0021529 A1* | 1/2016 | Park ..................... H04W 8/205 455/410 |
| 2016/0373920 A1 | 12/2016 | Petersson et al. |
| 2017/0142121 A1 | 5/2017 | Lee et al. |
| 2017/0156051 A1* | 6/2017 | Park ..................... H04L 67/303 |
| 2017/0231020 A1* | 8/2017 | Tomici ................ H04W 92/02 |
| 2018/0070224 A1 | 3/2018 | Park et al. |
| 2018/0131699 A1 | 5/2018 | Park et al. |
| 2018/0294949 A1 | 10/2018 | Yang |
| 2019/0364415 A1* | 11/2019 | Gao ....................... H04W 8/20 |
| 2019/0373448 A1 | 12/2019 | Gao |

OTHER PUBLICATIONS

"RSP Technical Specification Version 2.0," GSM Association, Oct. 14, 2016, 229 pages.

"Smart Cards; Card Application Toolkit (CAT)," ETSI TS 102 223, Version 12.1.0, Release 12, Sep. 2014, 244 pages.

U.S. Appl. No. 17/818,948—Final Office Action dated Aug. 28, 2023, 22 pages.

* cited by examiner

EMBEDDED UNIVERSAL INTEGRATED CIRCUIT CARD (eUICC) PROFILE CONTENT MANAGEMENT

CROSS-REFERENCE TO RELATED APPLICATIONS

The present application is a divisional of U.S. application Ser. No. 15/940,797, entitled "EMBEDDED UNIVERSAL INTEGRATED CIRCUIT CARD (eUICC) PROFILE CONTENT MANAGEMENT," filed Mar. 29, 2018, issued Dec. 20, 2022 as U.S. Pat. No. 11,533,160, which claims the benefit of U.S. Provisional Application No. 62/482,138, entitled "EMBEDDED UNIVERSAL INTEGRATED CIRCUIT CARD (eUICC) PROFILE CONTENT MANAGEMENT," filed Apr. 5, 2017, the contents of all of which are incorporated by reference herein in their entirety for all purposes.

FIELD

Embodiments disclosed herein relate to providing profile content from a mobile network operator (MNO) to an embedded universal integrated circuit card (eUICC) via a subscriber management data preparation server, for example, an SM-DP server or an SM-DP+ server.

BACKGROUND

A wireless device such as a mobile phone can include an eUICC hosting several profiles. Each profile may be associated with a different MNO. A profile may also be referred to as an electronic subscriber identity module (eSIM). An MNO provides access capability and communication services to subscribers through a mobile network infrastructure. A profile is a combination of operator data and applications, i.e., content, provisioned to an eUICC for providing those services. In this sense, the MNO is the owner or controller of the profiles associated with the MNO. Sometimes an MNO will update profile content.

For a given MNO-profile pair, secret keys are known only to the MNO and to the profile and not to other MNOs and not to other profiles, even if those other profiles are hosted in the same eUICC. Some of these secret keys are used, for example, in authentication and key agreement (AKA) message exchanges between a given profile in the eUICC and a mobile network when a subscriber requests network services using the given profile present in the eUICC of the wireless device. Because knowledge of the secret keys is a stepping-stone to network services, the confidentiality of these keys is guarded by the MNO. One of these keys is known as an over-the-air (OTA) key or keys. The OTA key can be used by the MNO to update profile content while keeping the content in an encrypted form so that, for example, the wireless device including the eUICC is unable to read the content in the clear. This OTA-key-based update arrangement may rely on an OTA Platform using remote application management (RAM) and/or remote file management (RFM) protocols and may use short message service (SMS).

Operation of infrastructure equipment and service agreements with third-party services are a cost for an MNO. A need exists to perform profile content updates without reliance on an OTA Platform.

SUMMARY

Methods and apparatuses are provided herein by which a provisioning server is used by an MNO to manage profile content in a profile present on an eUICC in a wireless device. The wireless device receives a profile content package from an MNO server via the provisioning server. In some embodiments, a local profile assistant in the device cooperates with the eUICC to install profile content from the profile content package in a profile issued by the MNO and already present on the eUICC.

In some embodiments, the MNO has a trust relationship with the entity operating the provisioning server. The MNO server then provides a profile content package to the delivery server and relies on the delivery server to format an RSP message or messages including a signature of the delivery server binding the profile content package to the eUICC on which the addressed profile is present.

In another embodiment, the MNO does not have a trust relationship with the entity operating the provisioning server. In the untrusted scenario, the MNO protects the profile content package by encrypting with an OTA key known to the addressed profile and not to others. A handshaking sequence based on the OTA is performed in some embodiments between the MNO server and the eUICC hosting the profile. In some embodiments, authentication is performed based on a function generator output maintained at both the provisioning server and the eUICC.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A mobile network operator may update profile content in a profile present on an eUICC. In embodiments presented herein, profile content management, including, e.g., a profile update, is achieved using an SMDP server rather than an OTA platform.

In general, a wireless device can be provisioned with a profile. Various network entities participate in provisioning of an profile to an eUICC hosted by a wireless device. Profile provisioning may also be referred to as eSIM or SIM provisioning herein. One architecture for profile provisioning is called Remote Sim Provisioning (RSP). Details of the RSP Architecture can be found in "RSP Architecture," Version 1.0, Dec. 23, 2015, Official Document SGP.21, GSM Association and in "RSP Technical Specification," Version 2.0, Oct. 14, 2016, Official Document SGP.22, GSM Association.

Aspects of eSIM provisioning include the downloading, installing, enabling, disabling, switching and deleting of a profile on an eUICC. A profile can contain one or more secure data used to prove identity and thus verify contract rights to services.

A profile can be identified by a unique number called an ICCID (Integrated Circuit Card Identifier). A wireless operator is a company providing wireless cellular network services. In some cases, the wireless device is user equipment used in conjunction with an eUICC to connect to a mobile network. An end user or customer is a person using a (consumer or enterprise) device. An enabled profile can include files and/or applications which are selectable over an eUICC-device interface.

In some instances, a provisioning call flow occurs as follows. A subscriber management data preparation server (referred to herein as a provisioning server, SMDP server, SMDP+ server, or eSIM server) and a wireless device establish a transport layer security (TLS) session. The SMDP server and an eUICC in the device then perform mutual authentication. As part of mutual authentication, the SMDP server learns an eUICC identifier and the eUICC receives a copy of a server PKI certificate, including an identity of the SMDP server. The SMDP server identity, in some embodiments, is an object identifier (OID). The device or eUICC then requests the assistance of the SMDP server with a provisioning function, for example, a BPP download followed by profile installation.

Embodiments providing profile content management will now be described with respect to the figures.

System

Figure 1:
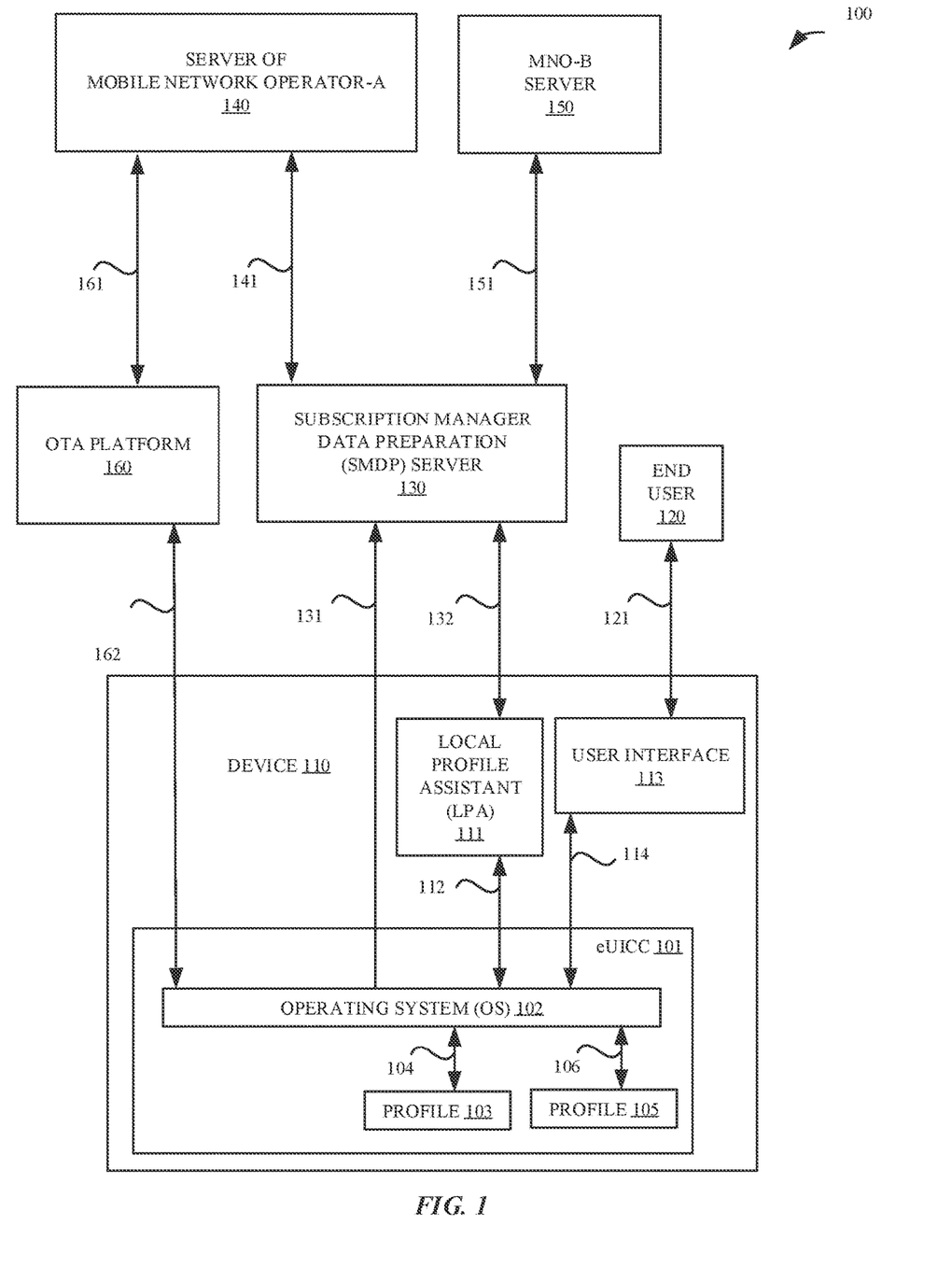
FIG. 1 illustrates an exemplary architecture including MNO servers, a subscriber management data preparation (SMDP) server, an OTA Platform, a device including an eUICC, and profiles present on the eUICC, according to some embodiments.

FIG. 1 illustrates an exemplary system 100 including a server 140 of an MNO referred to as MNO-A, a server 150 of another MNO referred to as MNO-B, an OTA platform 160, which can be a server or network, an SMDP server 130, and an end user 120. The server 140 of MNO-A communicates with OTA platform 160 over connection 161 and with SMDP server 130 over connection 141. The server 150 of MNO-B communicates with SMDP server 130 over connection 151. The interactions of the end user 120 with a device 110 are illustrated with the connection 121. FIG. 1 also illustrates the device 110 including an eUICC 101. Profiles 103 and 105 are present on the eUICC 101. Within the eUICC 101 is an operating system (OS) 102. The OTA platform may communicate with OS 102 via a connection 162. The OTA platform 160 is shown for reference, it is not an actor in the embodiments described herein. The SMDP server 130 can communicate with the OS 102 via a connection 131 and with a local profile assistant (LPA) 111 via a connection 132. LPA 111 can communicate with OS 102 via a connection 112. The profiles 103 and 105 communicate with the OS 102 via connections 104 and 106, respectively. Also shown in the device 110 is a user interface 113 with connection 114 to the OS 102.

SMDP and Device Logic

Figure 2:
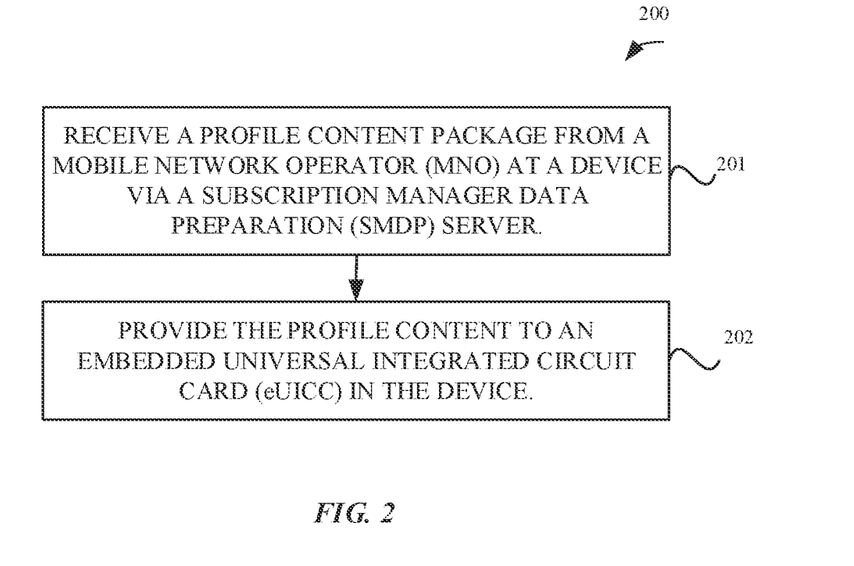
FIG. 2 illustrates exemplary logic for an SMDP server, according to some embodiments.

FIG. 2 illustrates exemplary logic 200 for a device, according to some embodiments. At 201, the device receives a profile content package from an MNO via an SMDP server. At 202, the device provides profile content from the profile content package to an eUICC in the device. The device can assist in installation of profile content in a profile of the eUICC using an LPA, in some embodiments.

Figure 3:
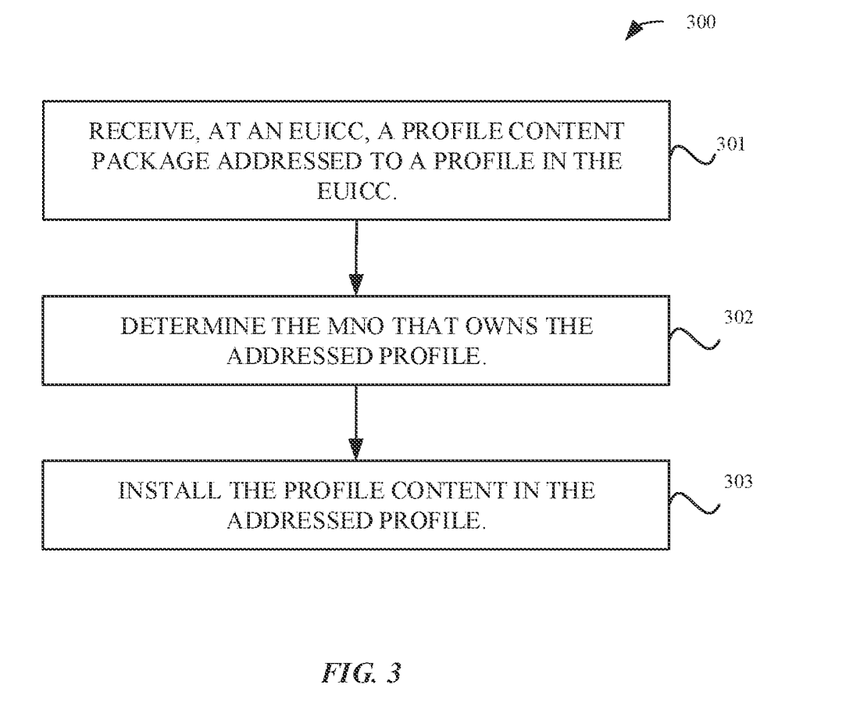
FIG. 3 illustrates exemplary logic for an eUICC, according to some embodiments.

FIG. 3 illustrates exemplary logic 300 for an eUICC, according to some embodiments. At 301, the eUICC receives a profile content package addressed to a profile present on the eUICC. At 302, the eUICC determines an MNO that owns the addressed profile. If the profile content is from an MNO that is not the owner of the addressed profile, the eUICC will discard the profile content package without installing it. At 303, after proper identification, the eUICC installs profile content from the profile content package in the addressed profile.

Trusted SMDP Message Flow

Figure 4:
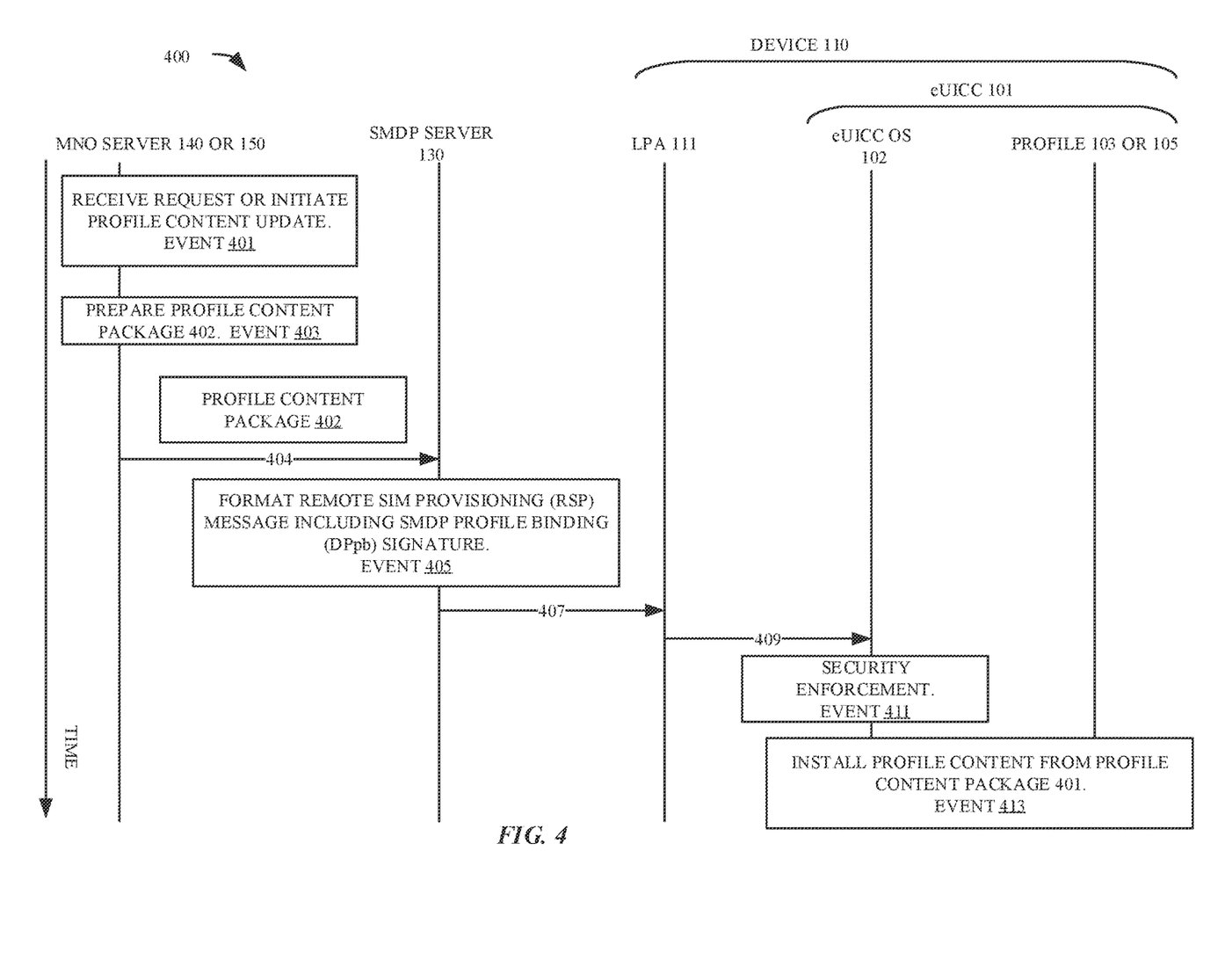
FIG. 4 illustrates an exemplary message flow for an MNO server to update profile content on a profile using an SMDP server, according to some embodiments.

FIG. 4 illustrates an exemplary message flow 400. Across the top of the figure are entity names from FIG. 1. Time advances from top to bottom. Activities at entities are called events and are so labelled. Messages between entities are shown as numbered arrows. The action begins with MNO server 140 or 150 (MNO-A or MNO-B) either receiving a request for, or initiating, a profile content update. This is marked as event 401. The MNO server prepares a profile content package 402 at event 403. Message 404 then carries the profile content package 402 to a provisioning server, shown in FIG. 4 as SMDP server 130.

In event 405, the SMDP server 130 formats an RSP message (or messages) including an SMDP profile binding (DPpb) signature that associates the RSP message or content with the eUICC hosting the profile addressed by the MNO. In some embodiments, the RSP message includes eSIM content updates (OTA script or a partial eSIM following eSIM format template) and/or eSIM update metadata. In some embodiments, the eSIM update metadata includes an ICCID value, an eSIM owner identifier (e.g., an identifier associated with MNO-A or MNO-B), and/or a signature of the SMDP server binding the profile content to the eUICC on which the profile is present. In some embodiments, the signature is a DPpb signature from a profile binding function (DPpb) of the SMDP server 130.

The RSP message 407 is sent to the device 110, which handles the RSP message using LPA 111. LPA 111 helps install the profile content package 402 with the eUICC OS 102 as generally indicated by message 409. The eUICC OS 102 performs security enforcement, shown as event 411. Security enforcement, in some embodiments, includes verification of a profile binding signature placed in message 407 by the SMDP server 130. This signature can be based on a public key of the SMDP server 130. Additional security enforcement, in some embodiments, includes verification of the MNO profile ownership corresponding to the target profile to be updated, which could include ICCID and MNO ID/OID matching of data, or additional MNO signature verification. In some embodiments, the public key is a DPpb key. Upon satisfying security checks of the security enforcement, the eUICC OS installs profile content from the profile content package in the addressed profile 103 or 105 (whichever is addressed) as shown by event 413.

MNO server 140 can manage profile content of profile 103 through the SMDP server 130. Similarly, MNO server 150 can manage profile content of profile 105 through the SMDP server 130. Thus, more than one MNO trusts the same SMDP server provider, in some embodiments. This trust can be established through a contractual business relationship.

Untrusted SMDP Message Flow

Figure 5:
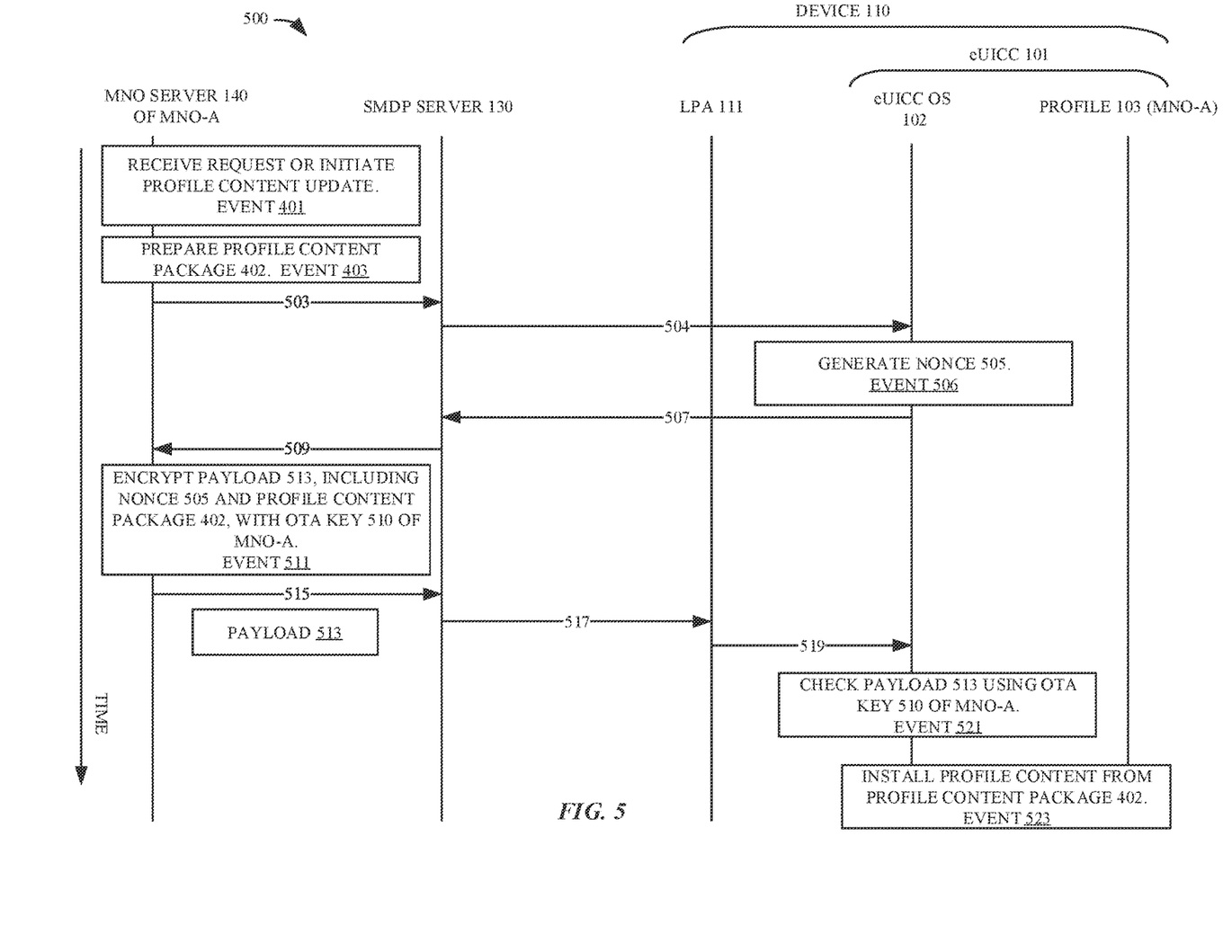
FIG. 5 illustrates an exemplary message flow for an MNO server to encrypt profile content using an OTA key to create a payload, and to route the payload via an SMDP server to an eUICC, according to some embodiments.

FIG. 5 illustrates a message flow 500 in which the MNO server 140 of MNO-A does not trust the SMDP server 130 for the purposes of profile content updates or installations. FIG. 5 has a format like that of FIG. 4. MNO-A encrypts profile content using an OTA key known to profile 103 and unknown to others.

The action begins again with events 401 and 403 in the upper left of FIG. 5, similar to those in FIG. 4. In some embodiments, MNO server 140 asks the eUICC to generate a nonce 505. This request is carried to the eUICC OS 102 via messages 503 and 504 by way the SMDP server 130. The eUICC OS 102 generates the nonce 505, at event 506, and returns it to the MNO server 140 via the SMDP server 130 using message 507, which is passed on to MNO server 140 as message 509.

At event 511, the MNO server 140 encrypts a payload 513 including the nonce 505 and profile content package 402. For instance, the inclusion of the nonce 505 can be in the form of a secure channel set up with key derivations, and/or hash/signature/ICV calculations with the nonce 505 as an input. The encryption is done with OTA key 510 associated with MNO-A and known to profile 103. An integrity check value (ICV), e.g., a checksum or hash of the message, is added to the encrypted payload, in some embodiments. The payload 513 is carried by messages 515, 517, and 519 to the eUICC OS 102. At event 521, the eUICC OS 102, within a security domain of MNO-A, uses the OTA key 510 obtained from the profile 103 to check the authenticity of the payload 513. This check is performed in some embodiments, by attempting to recover, including decryption with the OTA key 510, a nonce from the payload 513. If the decrypted nonce matches the sent nonce 505 and/or a hash, ICV, or signature calculated based on the sent nonce is successfully verified, for example, by matching with a received hash, ICV or signature, then the eUICC is satisfied that the payload 513 originated with the trusted source MNO-A. Based on this successful security check, event 523 indicates installation of the profile content from the profile content package 402 in the profile 103. Use of OTA keys (e.g., OTA key 510) enforces an ownership check cryptographically, thus the profile ownership verification mentioned above with respect to event 411 in FIG. 4 is optional to perform.

eUICC, Untrusted SMDP, Nonce-Based Logic

Figure 6:
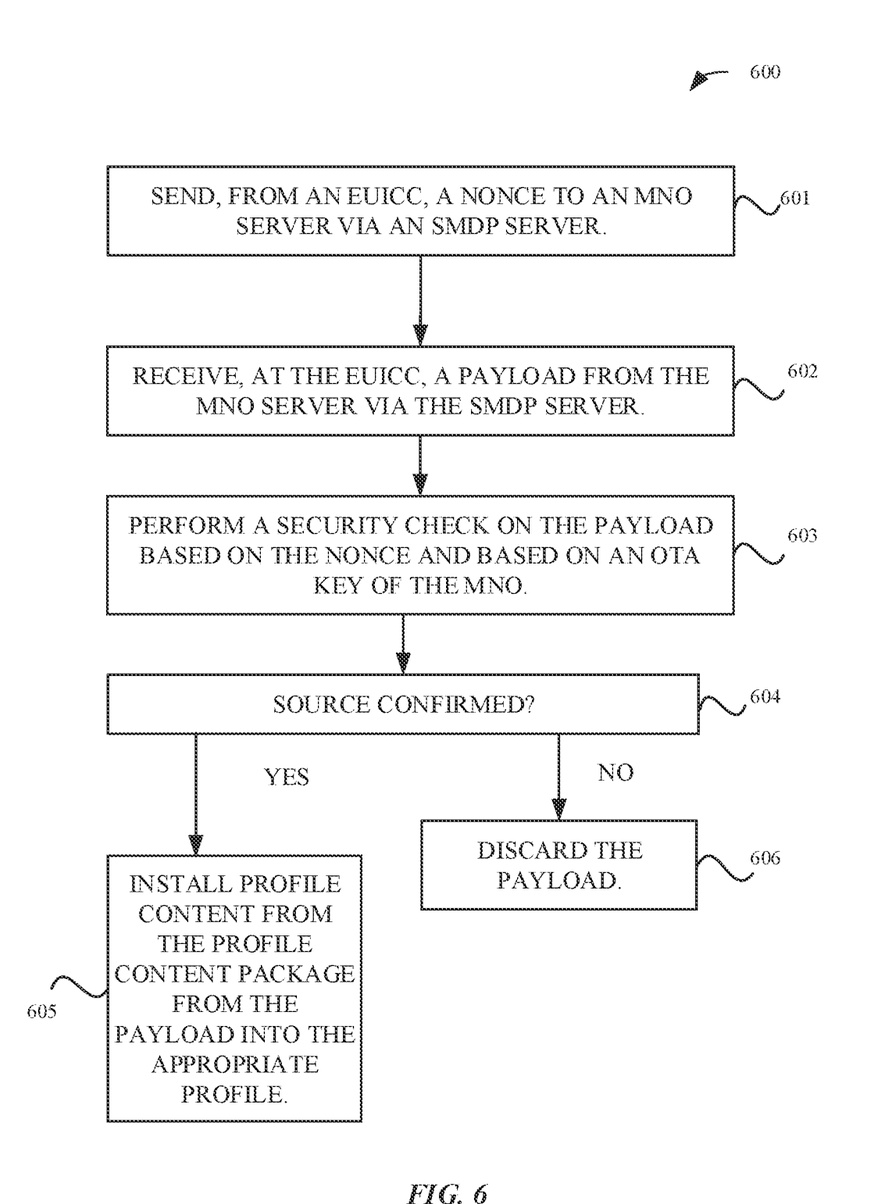
FIG. 6 illustrates exemplary logic for performing a challenge-response authentication check between an eUICC and an MNO server via an SMDP server, according to some embodiments.

FIG. 6 illustrates exemplary logic 600 performed by an eUICC when the MNO does not trust the SMDP for profile content updates or installations. At 601, the eUICC sends a nonce to an MNO server via an SMDP server. At 602, the eUICC receives a payload from the MNO server via the SMDP server. At 603, the eUICC performs a security check on the payload based on the sent nonce, the payload, and an OTA key associated with the MNO. At 604, the eUICC determines if a received nonce in the payload matches a previously sent nonce, and if it does, the logic flows to 605. 604 could be an optional step if there is at max only 1 nonce stored on the eUICC, and the 603 security check based on that nonce would be sufficient. At 605, the eUICC installs profile content from the profile content package in the profile associated with the MNO. If the security check fails, the logic flows to 606 and the eUICC discards the received payload.

eUICC, Untrusted SMDP, Function-Generator-Based Logic

Figure 7:
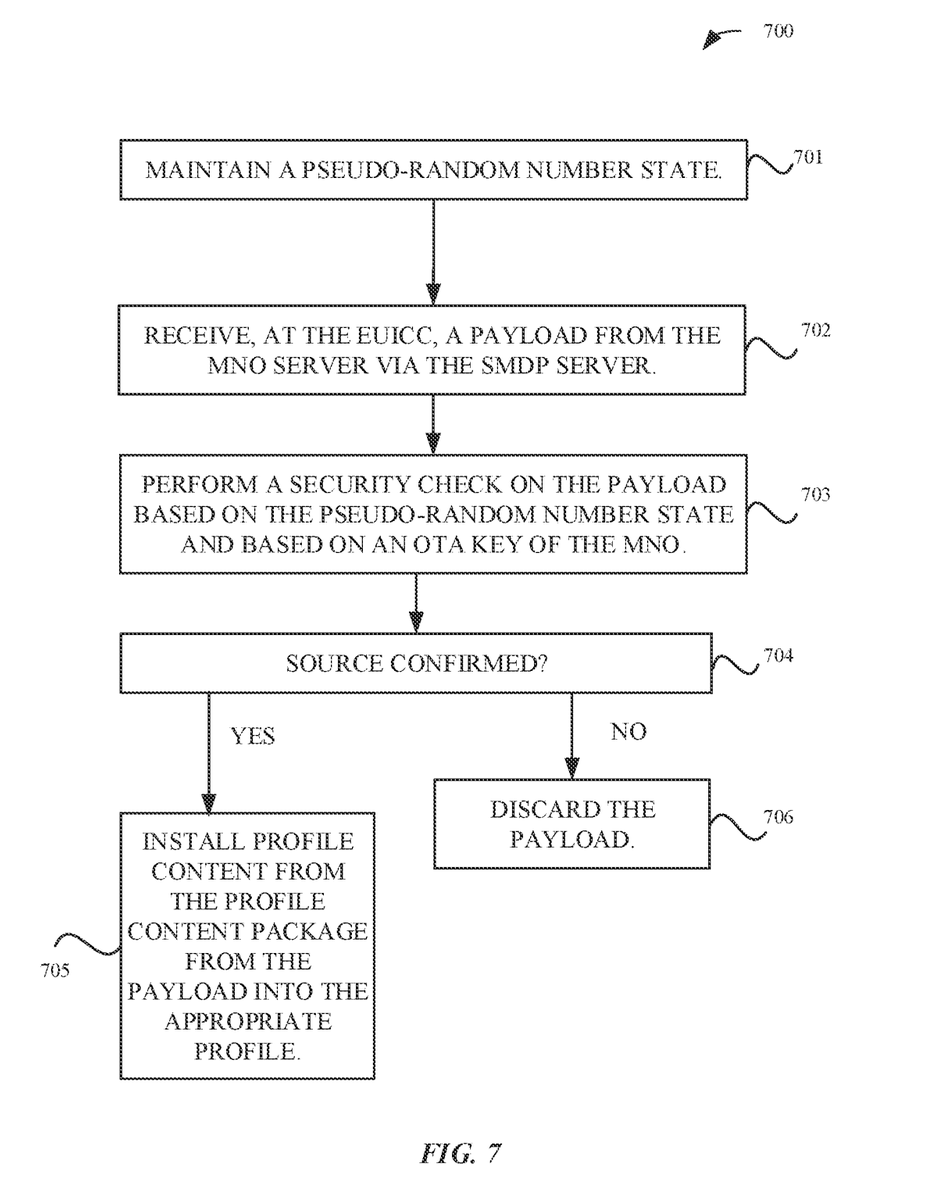
FIG. 7 illustrates exemplary logic for performing an authentication check based on a function generator value, where the authentication check is between an eUICC and an MNO server via an SMDP server, according to some embodiments.

FIG. 7 illustrates alternative exemplary logic 700 performed by an eUICC when the MNO does not trust the SMDP for profile content updates or installations. At 701, the eUICC maintains a pseudo-random number state of a function generator. At 702, the eUICC receives a payload from the MNO server via the SMDP server. At 703, the eUICC performs a security check on the payload based on the pseudo-random number state and an OTA key associated with the MNO. At 704, as a result of the security check at 703, if a received encrypted function generator output in the payload matches the pseudo-random number state, the logic flows to 705. At 705, the eUICC installs profile content from the profile content package in the profile associated with the MNO. If the security check fails, the logic flows to 706 and the eUICC discards the received payload.

eUICC Details

Figure 8:
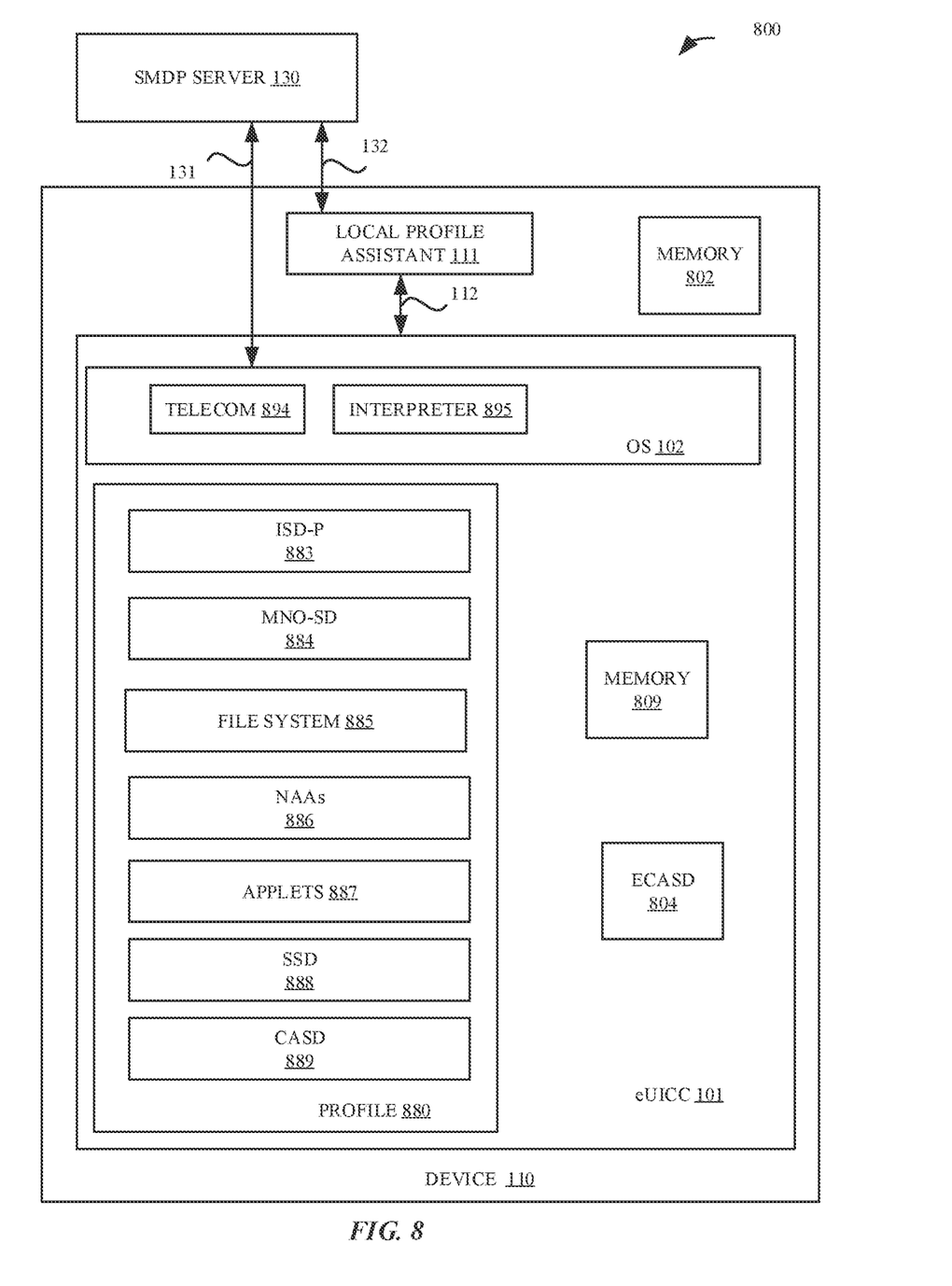
FIG. 8 illustrates exemplary details of an eUICC and a profile, according to some embodiments.

FIG. 8 illustrates a system 800 with details of the eUICC 101 including a profile 880. Profile 880 is exemplary of profiles 103 and 105 of FIG. 1. The eUICC 101 includes the operating system 102. Within the operating system 102 is a telecom framework 894 which provides authentication algorithms to network access applications (such as NAAs 886). Interpreter 895 translates profile content package data into an installed profile content using a specific internal format of the eUICC 101. ISD-P 883 hosts the profile 880. The ISD-P is a secure container (security domain) for the hosting of the profile 880. The ISD-P is used for profile content management in collaboration with the interpreter 895 for the decoding of a received profile content package. An ISD-R (not shown) on the eUICC 101 is responsible for the creation of new ISD-Ps on the eUICC 101 and the lifecycle management of all ISD-Ps on the eUICC 101. ECASD 804 provides secure storage of credentials required to support the security domains on eUICC 101. In some embodiments, the eUICC 101 includes an additional memory 809. MNO-SD 884 is the representative on the eUICC 101 of the operator providing services via the profile 880 to the end user 120. The MNO-SD 884 contains the operator's OTA keys and provides a secure OTA channel as described herein with respect to FIGS. 5-7. Embodiments provided herein also include storing OTA keys within ISD-P, e.g., ISD-P 883. An ISD-P is a useful security domain for key storage for embodiments in which profile content update is managed for both enabled and disabled profiles. In some embodiments, the device 110 includes a memory 802. In some embodiments, the profile 880 includes a file system 885, applets 887, an SSD 888, and/or a controlling authority security domain (CASD) 889.

Example Device Connections

Figure 9:
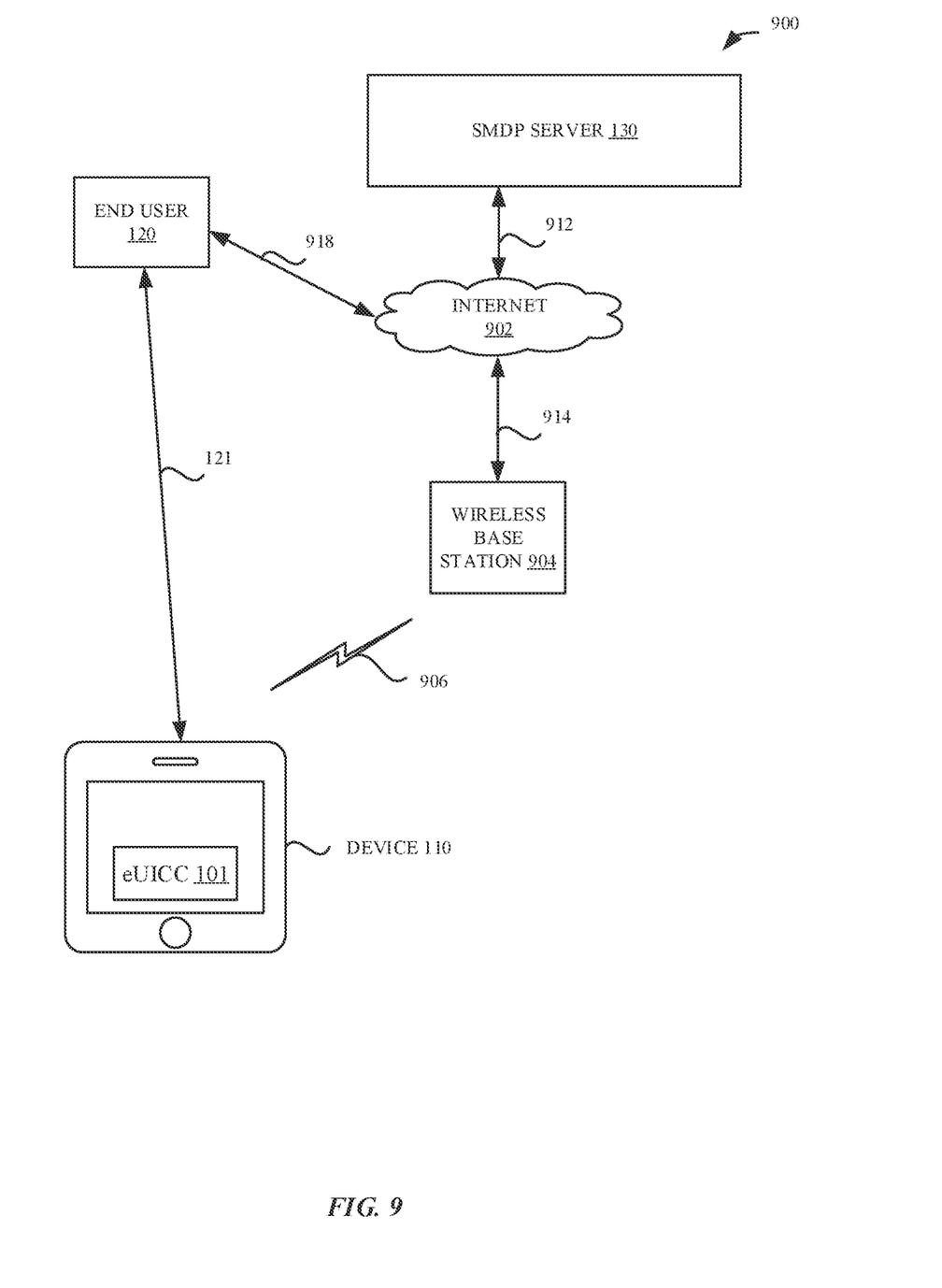
FIG. 9 illustrates exemplary network connections of entities described herein, according to some embodiments.

FIG. 9 illustrates example connection methods for profile content management in a system 900. End user 120 can manage device 110 via connection 121, which can convey end user actions such as requesting a profile content update. The end user 120 can also remotely manage device 110 via the Internet 902 using interface 918. The device 110 is shown connected to a wireless base station 904. The wireless base station 904 communicates with the device 110 via a wireless link 906. The wireless base station 904 can be an Institute of Electronic and Electrical Engineers 802.11 Wireless Fidelity (IEEE 802.11 Wi-Fi) access point (AP) or the wireless base station 904 can be, for example, a cellular mobile network base station. The wireless base station 904 can connect with the Internet 902 via interface 914. The SMDP server 130 can connect with the Internet 902 via interface 912. Examples of cellular mobile network base stations are a 2G or 3G base station or an LTE eNode B. After successful installation of profile content from the profile content package 402, the end user 120 can enjoy a requested carrier plan or a requested wireless service using the associated updated profile, for example, profile 103.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 10:
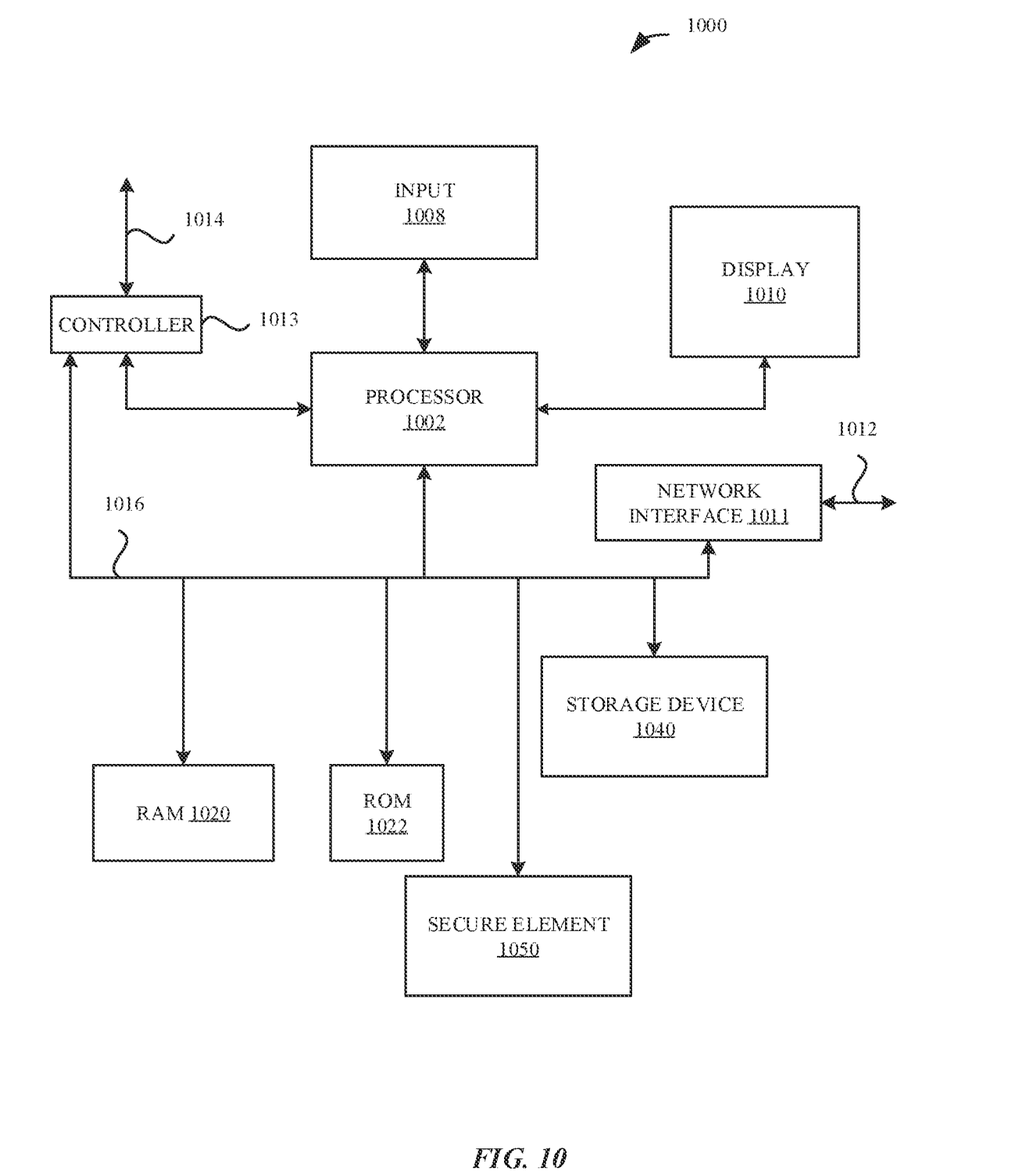
FIG. 10 illustrates an exemplary apparatus for implementation of the embodiments disclosed herein, according to some embodiments.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in one or more of the device 110, the eUICC 101, MNO servers 140 or 150, and/or the SMDP server 130 illustrated in FIG. 1. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000. The computing device 1000 can also include a secure element 1050.

Representative Exemplary Embodiments

In some embodiments, a method performed by an embedded universal integrated circuit card (eUICC) in a device includes: (i) receiving, from a provisioning server via the device, a message including a profile content package, where (a) the message includes metadata, and (b) a source of the profile content package is a mobile network operator (MNO) server operated by an MNO; (ii) performing a verification of the message based on the metadata; (iii) installing first data in a profile present on the eUICC when the verification is successful, where the profile content package includes the first data; and (iv) discarding the profile content package when the verification is not successful.

In some embodiments, the profile content package includes an over-the-air (OTA) script. In some embodiments, the profile content package includes an electronic subscriber identity module (eSIM) component. In some embodiments, the eSIM component follows an eSIM format template. In some embodiments, the metadata includes an integrated circuit card identifier (ICCID), an eSIM owner identifier, and/or a signature. In some embodiments, the eUICC performs the verification by at least determining a second SIM owner identifier corresponding to the ICCID; and comparing the SIM owner identifier with the second SIM owner identifier. In some embodiments, the signature is a DPpb signature output by a profile binding function of the provisioning server. In some embodiments, the installing includes identifying a profile on the eUICC identified by the ICCID. In some embodiments, the performing the verification further includes verifying the signature by performing a PKI decryption algorithm on the signature using a public key of the provisioning server. In some embodiments, the message includes a public key infrastructure (PKI) certificate of the MNO. In some embodiments, the performing the verification further includes comparing the PKI certificate with an eSIM owner identifier.

In some embodiments, a method performed by an embedded universal integrated circuit card (eUICC) in a device includes: (i) receiving, from a provisioning server via the device, a first message including a first profile content package, where (a) the first message includes first metadata, and (b) a source of the first profile content package is a first mobile network operator (MNO) server operated by a first MNO; (ii) performing a first verification of the first message based on the first metadata; (iii) installing first data in a first profile present on the eUICC when the first verification is successful, where the first profile content package includes the first data; (iv) receiving, from the provisioning server via the device, a second message including a second profile content package, where (a) the second message includes second metadata, and (b) the source of the second profile content package is a second MNO server operated by a second MNO; (v) performing a second verification of the second message based on the second metadata; and (vi) installing second data in a second profile present on the eUICC, wherein the second profile content package includes the second data when the second verification is successful.

In some embodiments, a method performed by an embedded universal integrated circuit card (eUICC) in a device includes: (i) sending a nonce to a mobile network operator (MNO) server via the device and a provisioning server, where the MNO server is operated by an MNO; (ii) receiving, from the provisioning server via the device, a message including a profile content package, where the message includes an encrypted version of the nonce; (iii) performing a verification of the message based on the encrypted version of the nonce; (iv) installing first data in a profile present on the eUICC when the verification is successful, where the profile content package includes the first data; and (v) discarding the profile content package when the verification is not successful.

In some embodiments, the verifying further includes decrypting the encrypted version of the nonce using a public key of the MNO. In some embodiments, the verifying further includes: (i) parsing a first integrity check value (ICV) from the message; (ii) computing a second ICV based on the message; (iii) performing a comparison of the first ICV and the second ICV; and (iv) sending a second message to the provisioning server when the comparison indicates that the message has been modified, where the second message includes a retransmission request. In some embodiments, the provisioning server is a subscriber management data preparation (SMDP) server. In some embodiments, the verifying further includes decrypting the encrypted version of the nonce using a pre-shared symmetric key. In some embodiments, the pre-shared symmetric key is an over-the-air (OTA) key.

In some embodiments, a method performed by an embedded universal integrated circuit card (eUICC) in a device includes: (i) receiving a signal to initialize a state of a function generator; (ii) initializing the state of the function generator; (iii) receiving, from a provisioning server via the device, a message including a profile content package, where the message includes an encrypted version of an output of the function generator; (iv) installing first data in a profile present on the eUICC when the verification is successful, where the profile content package includes the first data; and (v) discarding the profile content package when the verification is not successful.

In some embodiments, the signal to initialize the state of the function generator is received from a mobile network operator (MNO) server associated with an MNO. In some embodiments, the function generator is a pseudo-random function generator.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. A method comprising:
by an embedded universal integrated circuit card (eUICC) in a device:
receiving a signal to initialize a pseudo-random number state of a function generator maintained by the eUICC;
initializing the pseudo-random number state of the function generator;
receiving, from a mobile network operator (MNO) server via a provisioning server and via the device, a message including a payload, the payload comprising:
a profile content package addressed to a profile installed on the eUICC and for updating the profile;
an integrated circuit card identifier (ICCID) value of the profile;
an MNO identifier (ID) value identifying the MNO that owns the profile; and
an encrypted version of an output of a corresponding function generator maintained by the MNO server associated with an MNO;
decrypting the encrypted version of the output of the corresponding function generator of the MNO using an over-the-air (OTA) key obtained from the profile installed on the eUICC to produce a decrypted version of the output of the corresponding function generator of the MNO;
performing a first verification of the message based on the pseudo-random number state of the function generator maintained by the eUICC matching the decrypted version of the output of the corresponding function generator;
performing a second verification of the message based on comparing a second MNO ID value associated with the ICCID value to the MNO ID value included in the payload;
when the first verification and the second verification of the message are successful, installing first data in the profile installed on the eUICC, wherein the profile content package includes the first data; and
when the first verification or the second verification of the message is not successful, discarding the profile content package,
wherein
the MNO server does not trust the provisioning server for profile content updates or installations; and
the profile content package comprises a partial electronic subscriber identity module (eSIM) for updating content of the profile present on the eUICC.

2. The method of claim 1, wherein the signal to initialize the pseudo-random number state of the function generator is received from the MNO server associated with the MNO.

3. The method of claim 1, wherein the provisioning server is a subscriber management data preparation (SMDP) server managed by an SMDP server provider other than the MNO and untrusted by the MNO.

4. The method of claim 1, wherein the eUICC performs the first verification and the second verification of the message within a security domain reserved for the MNO within the eUICC.

5. The method of claim 1, wherein the profile installed on the eUICC comprises a disabled profile within an ISD-P security domain.

6. An embedded universal integrated circuit card (eUICC) configured in a device, the eUICC including a processor and instructions that, when executed by the processor, configure the eUICC to:
receive, from a mobile network operator (MNO) server associated with an MNO via a provisioning server and via the device, a signal to initialize a pseudo-random number state of a function generator maintained by the eUICC;
initialize the pseudo-random number state of the function generator;

receive, from the MNO server via the provisioning server and via the device, a message including a payload, the payload comprising:
- a profile content package addressed to a profile installed on the eUICC and for updating the profile;
- an integrated circuit card identifier (ICCID) value of the profile;
- an MNO identifier (ID) value identifying the MNO that owns the profile; and
- an encrypted version of an output of a corresponding function generator maintained by the MNO server associated with an MNO;

decrypt the encrypted version of the output of the corresponding function generator of the MNO using an over-the-air (OTA) key obtained from the profile installed on the eUICC to produce a decrypted version of the output of the corresponding function generator of the MNO;

perform a first verification to verify the message based on the pseudo-random number state of the function generator maintained by the eUICC matching the decrypted version of the output of the corresponding function generator;

perform a second verification to verify the message based on comparing a second MNO ID value associated with the ICCID value to the MNO ID value included in the payload;

when the first verification and the second verification of the message are successful, install first data in the profile installed on the eUICC, wherein the profile content package includes the first data; and when the first verification or the second verification of the message is not successful, discard the profile content package, wherein
- the MNO server does not trust the provisioning server for profile content updates or installations; and
- the profile content package comprises a partial electronic subscriber identity module (eSIM) for updating content of the profile present on the eUICC.

7. The eUICC of claim 6, wherein the provisioning server is a subscriber management data preparation (SMDP) server managed by an SMDP server provider other than the MNO and untrusted by the MNO.

8. The eUICC of claim 6, wherein the eUICC performs the first verification and the second verification of the message within a security domain reserved for the MNO within the eUICC.

9. The eUICC of claim 6, wherein the profile installed on the eUICC comprises a disabled profile within an ISD-P security domain.

10. A non-transitory computer-readable medium storing instructions that, when executed by a processor of an embedded universal integrated circuit card (eUICC) of a device, configure the eUICC to:
receive, from a mobile network operator (MNO) server associated with an MNO via a provisioning server and via the device, a signal to initialize a pseudo-random number state of a function generator maintained by the eUICC;

initialize the pseudo-random number state of the function generator;

receive, from the MNO server via the provisioning server via the device, a message including a payload, the payload comprising:
- a profile content package addressed to a profile installed on the eUICC and for updating the profile;
- an integrated circuit card identifier (ICCID) value of the profile;
- an MNO identifier (ID) value identifying the MNO that owns the profile; and
- an encrypted version of an output of a corresponding function generator maintained by the MNO server associated with an MNO;

decrypt the encrypted version of the output of the corresponding function generator of the MNO using an over-the-air (OTA) key obtained from the profile installed on the eUICC to produce a decrypted version of the output of the corresponding function generator of the MNO;

perform a first verification of the message based on the pseudo-random number state of the function generator maintained by the eUICC matching the decrypted version of the output of the corresponding function generator;

perform a second verification of the message based on comparing a second MNO ID value associated with the ICCID value to the MNO ID value included in the payload;

when the first verification and the second verification of the message are successful, install first data in the profile installed on the eUICC, wherein the profile content package includes the first data; and when the first verification or the second verification of the message is not successful, discard the profile content package, wherein
- the MNO server does not trust the provisioning server for profile content updates or installations; and
- the profile content package comprises a partial electronic subscriber identity module (eSIM) for updating content of the profile present on the eUICC.

11. The non-transitory computer-readable medium of claim 10, wherein the provisioning server is a subscriber management data preparation (SMDP) server managed by an SMDP server provider other than the MNO and untrusted by the MNO.

12. The non-transitory computer-readable medium of claim 10, wherein the eUICC performs the first verification and the second verification of the message within a security domain reserved for the MNO within the eUICC.

13. The non-transitory computer-readable medium of claim 12, wherein the profile installed on the eUICC comprises a disabled profile within an ISD-P security domain.

* * * * *